(12) United States Patent
Mixter

(10) Patent No.: US 11,308,393 B2
(45) Date of Patent: Apr. 19, 2022

(54) CYBER ANOMALY DETECTION USING AN ARTIFICIAL NEURAL NETWORK

(71) Applicant: Raytheon Company, Waltham, MA (US)

(72) Inventor: John E. Mixter, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 825 days.

(21) Appl. No.: 16/046,336

(22) Filed: Jul. 26, 2018

(65) Prior Publication Data

US 2020/0034700 A1   Jan. 30, 2020

(51) Int. Cl.
*G06N 3/08* (2006.01)
*G06N 3/063* (2006.01)
*H04L 29/06* (2006.01)

(52) U.S. Cl.
CPC ............ *G06N 3/08* (2013.01); *G06N 3/063* (2013.01); *H04L 63/1425* (2013.01)

(58) Field of Classification Search
CPC ....... G06N 3/08; G06N 3/063; H04L 63/1425
See application file for complete search history.

(56) References Cited

U.S. PATENT DOCUMENTS

2019/0152466 A1 * 5/2019 Suzuki ............... H04L 63/1425

FOREIGN PATENT DOCUMENTS

WO   WO-2014/066166 A2 * 10/2012 ............ G06N 3/08
WO   WO-2020023742 A1    1/2020

OTHER PUBLICATIONS

Tang, T. et al, Deep Learning Approach for Network Intrusion Detection in Software Defined Networking [online], 2016 [retrieved May 26, 2021]. Retrieved from Internet:<https://ieeexplore.ieee.org/stamp/stamp.jsp?tp=&arnumber=7777224> (Year:2016) (Year: 2016).*

Murphree, Jerry, Machine Learning Anomaly Detection in Large Systems [online], 2016 [retrieved May 26, 2021], Retrieved from Internet:<https://ieeexplore.ieee.org/stamp/stamp.jsp?tp=&arnumber=7589589> (Year: 2016) (Year: 2016).*

Saurav, Sakti, Online Anomaly Detection with Concept Drift Adaptation using Recurrent Neural Networks, [retrieved on Dec. 7, 2021]. Retrieved from Internet:<https://dl.acm.org/doi/abs/10.1145/3152494.3152501> (Year: 2018).*

(Continued)

*Primary Examiner* — Brian M Smith
*Assistant Examiner* — Bart I Rylander
(74) *Attorney, Agent, or Firm* — Schwegman Lundberg & Woessner, P.A.

(57) ABSTRACT

A hardware-based artificial neural network receives data patterns from a source. The hardware-based artificial neural network is trained using the data patterns such that it learns normal data patterns. A new data pattern is identified when the data pattern deviates from the normal data patterns. The hardware-based artificial neural network is then trained using the new data pattern such that the hardware-based artificial neural network learns the new data pattern by altering one or more synaptic weights associated with the new data pattern. The rate at which the hardware-based artificial neural network alters the one or more synaptic weights is monitored, wherein a training rate that is greater than a threshold indicates that the new data pattern is malicious.

17 Claims, 4 Drawing Sheets

(56) References Cited

OTHER PUBLICATIONS

"International Application Serial No. PCT US2019 043431, International Search Report dated Dec. 13, 2019", 4 pgs.
"International Application Serial No. PCT US2019 043431, Written Opinion dated Dec. 13, 2019", 9 pgs.
Andropov, Sergey, "Network anomaly detection using artificial neural networks", 2017 20th Conference of Open Innovations Association (FRUCT), FRUCT, (Apr. 3, 2017), 6 pgs.
Bendelac, Shiri, "Enhanced Neural Network Training Using Selective Backpropagation and Forward Propagation", [Online] Retrieved from the internet:https: vtechworks.lib.vt.edu bitstream handle 10919 83714 Bendelac_S_T_2018.pdf?sequence=landi sAllowed=y, (Jun. 22, 2018), 97 pgs.
Mohammad-Taghi, "A Fast Simplified Fuzzy ARTMAP Network", Neural Processing Letters, [Online] Retrieved from the internet:https: 1ink.springer.com content pdf 10.1023 A:1026004816362.pdf, (Jun. 1, 2003), 44 pgs.
Tang, Tuan, "Deep learning approach for Network Intrusion Detection in Software Defined Networking", 2016 International Conference on Wireless Networks and Mobile Communications (WINCOM), IEEE, (Oct. 26, 2016), 6 pgs.
Weiwei, Hu, "Generating Adversarial Malware Examples for Black-Box Attacks Based on GAN", arxiv.org, Cornell University Library, 201 Olin Library Cornell University Ithaca, NY 14853, (Feb. 20, 2017), 7 pgs.
"International Application Serial No. PCT/US2019/043431, International Preliminary Report on Patentability dated Feb. 4, 2021", 11 pgs.

\* cited by examiner

CYBER ANOMALY DETECTION USING AN ARTIFICIAL NEURAL NETWORK

TECHNICAL FIELD

The present disclosure relates to cyber anomaly detection, and in an embodiment, but not by way of limitation, the use of an artificial neural network to detect a cyber anomaly.

BACKGROUND

Reliably detecting malicious data patterns is one of the goals of cyber security. Most detection techniques rely on software to sift through voluminous amounts of data, however, this is a slow and painstaking process. The art and industry are in need of a faster, more efficient, and more accurate process to identify and detect malicious data patterns. Because of the large amount of data to be processed in real-time, the detection should be hardware-based and very fast.

DETAILED DESCRIPTION

Figure 1:
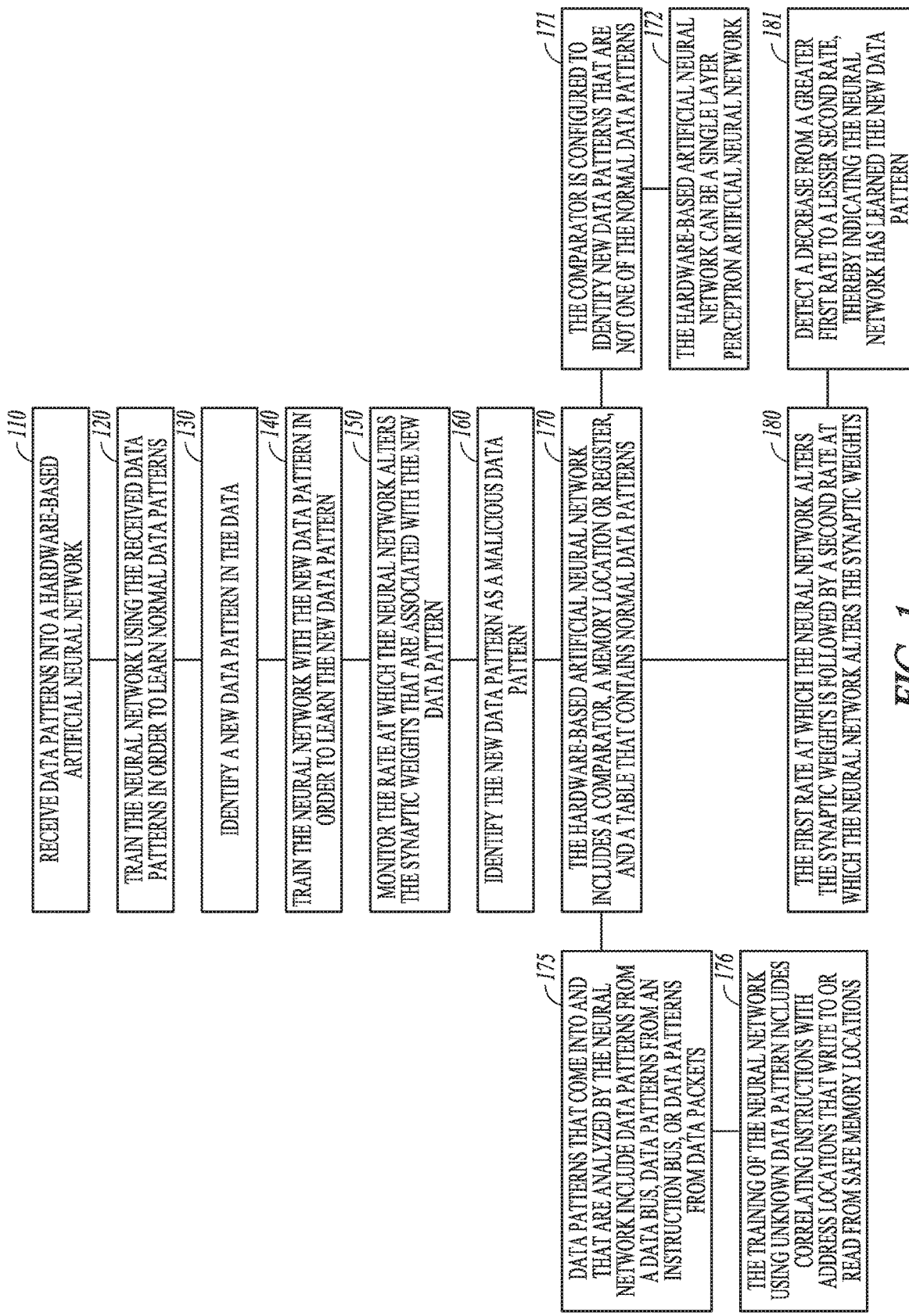
FIG. 1 is a block diagram illustrating operations and features of an example system and method for detecting malware in a computer system.

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

Single layer hardware-based artificial neural networks can help solve the problem of detecting malicious computer code in a timely fashion. Specifically, an embodiment uses a hardware-based artificial neural network to learn and detect pattern changes in a data bus, an instruction bus, or data packets. The embodiment then uses the change in learning rate of the hardware-based artificial neural network to determine system deviation from the norm, and consequently whether the detected pattern change is of a malicious nature.

Single layer artificial neural networks, which can also be referred to as perceptron-based neural networks, have proven to be very good at predicting the direction of conditional branches in microprocessor hardware. By feeding the history of past branch behavior into the neural networks, the perceptron predictors routinely achieve over 95% branch prediction accuracies. The perceptron predictors exceed the capabilities of traditional predictors because they can use very long buffers of past branch behavior. The long histories allow the detection of distant correlations which are missed by traditional predictors.

In an embodiment, the branch prediction scheme described above can be extended to detecting malicious data patterns on microprocessor data buses, microprocessor instruction buses, Internet data packets, or other data sources. Instead of feeding the artificial neural network a history of resolved branch directions, the continuous microprocessor bus data, microprocessor instruction bus data, or Internet packet information serves as the input. Also, instead of using a software-based artificial neural network, a hardware-based neural network can be used. In the case of bus data, the artificial neural network learns the normal bus traffic. The artificial neural network can correlate instructions with address locations, either writing to or reading from safe memory locations.

In the event of a virus or other malicious data or code, the bus traffic will deviate from the norm. The artificial neural network can sense something is wrong in two ways. One way is pattern change. The artificial neural network can determine that a new data pattern coming into a system deviates from the normal flow. The artificial neural network then has the option to try to learn the new pattern. This learning of the new pattern leads to the second level of detection—the change in the learning rate. Specifically, as discussed further herein, malicious data will exhibit a greater initial learning rate than did normal data patterns.

A perceptron-based neural network is different from standard networks in that it is continually learning new patterns. When a new pattern is encountered, the perceptron-based neural network attempts to learn the pattern by altering its synaptic weights. The training rate increases when the artificial neural network first starts to learn the new pattern, since the synaptic weights are being updated very frequently. As the pattern is learned, the rate at which the weights are updated slows until the pattern is fully learned or recognized. Thereafter, when a new, unknown pattern is encountered, the learning rate jumps once again as the synaptic weights are frequently updated. By monitoring the rate of change, unknown patterns can be detected, and when such new initial training rates are greater than training rates associated with normal data patterns, such initial training rates can identify malicious data patterns. The rate of change detection can also be applied to detecting an imminent mechanical system failure. By monitoring system parameters such as temperature, speed, and vibration, the artificial neural network can determine normal operation. As the system changes, the artificial neural network attempts to learn the new normal. The rate at which the network tries to learn can be used to detect failure.

Figure 2:
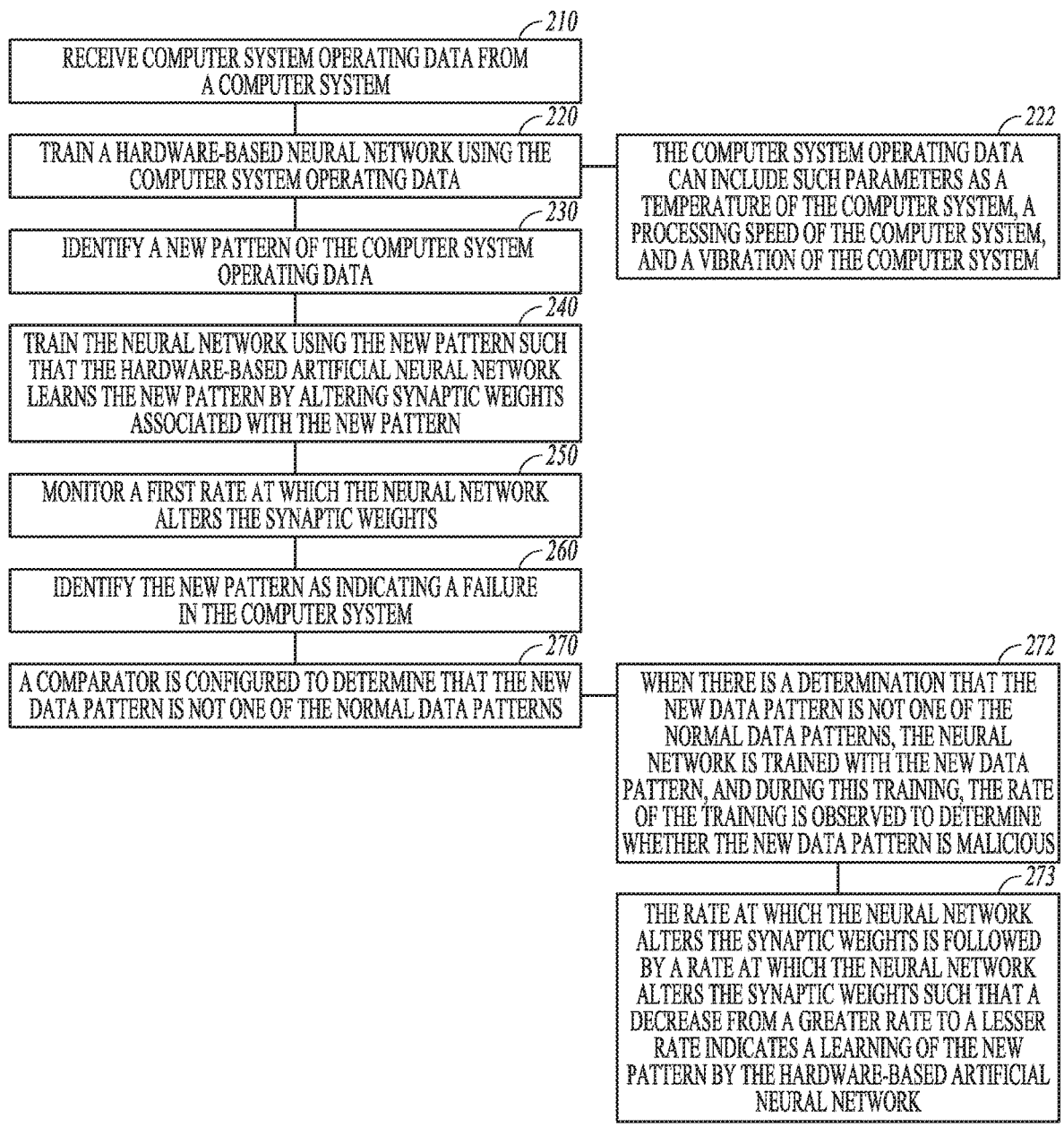
FIG. 2 is a block diagram illustrating operations and features of an example system and method for identifying computer system failure conditions.

FIGS. 1 and 2 are block diagrams illustrating operations and features of example systems and methods for detecting malware and identifying computer system failure conditions respectively. FIGS. 1 and 2 include a number of process blocks 110-181 and 210-273 respectively. Though arranged substantially serially in the examples of FIGS. 1 and 2, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 3:
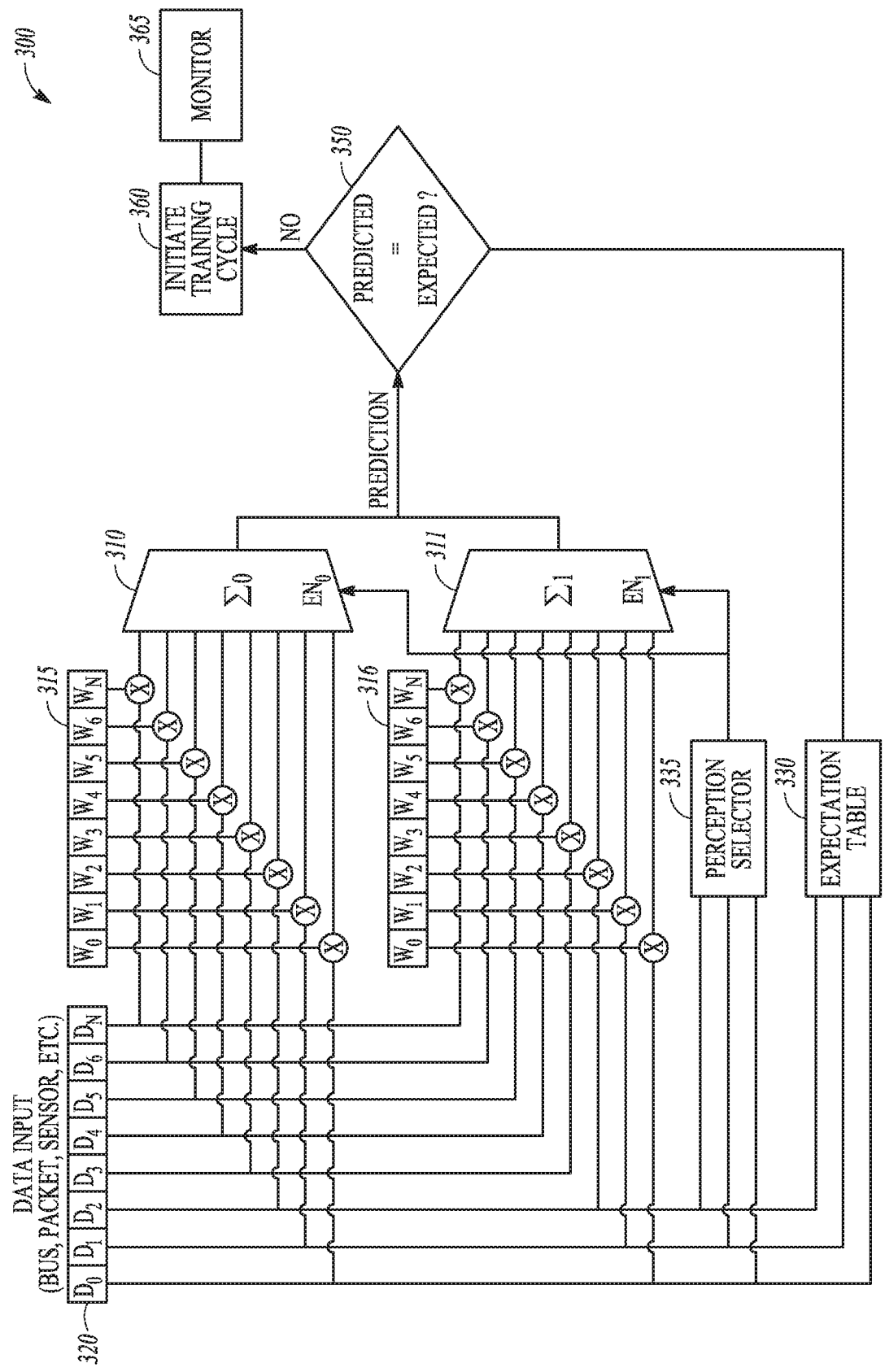
FIG. 3 is a block diagram illustrating a hardware-based artificial neural network.

Referring now specifically to FIG. 1, at 110, a system operable to detect malware in a computer system receives data patterns in real time into an input buffer of a hardware-based artificial neural network. While a software-based artificial neural network could be used, because of the greater execution speed of a hardware-based system, a hardware-based artificial neural network is preferred. A block diagram of an example embodiment of a hardware-based neural network is illustrated in FIG. 3, and its operation in connection with the process of FIG. 1 will be described herein. After receiving the data patterns, at 120, the hardware-based artificial neural network is trained using the received data patterns. The purpose of this training is for the hardware-based artificial neural network to learn the normal data patterns of the computer system. After a certain amount of training and learning in operation 120, as indicated at 130, the system, upon receiving additional data into the hardware-based artificial neural network, is able to identify a new data pattern in the additional data. The system is able to identify such a new data pattern when the new data pattern deviates from the normal data patterns.

After the identification of a new data pattern, at 140, the hardware-based artificial neural network is trained with the just-recognized new data pattern. The purpose of this second training is for the hardware-based artificial neural network to learn the new data pattern. In an embodiment, the hardware-based artificial neural network is trained to learn this new data pattern by altering the synaptic weights that are associated with the new data pattern in the neural network. During this training with the new data pattern, at 150, the system monitors the rate at which the hardware-based artificial neural network alters the synaptic weights that are associated with the new data pattern. Specifically, when the hardware-based artificial neural network first recognizes and begins learning a new data pattern, the rate at which the neural network learns the new pattern is rather high (compared to learning normal data patterns), since the synaptic weights are frequently changed in the early learning stage. Thereafter, as the synaptic weights approach their stable values, the learning rate decreases because the synaptic weights are not changed as often.

Then, at 160, the hardware-based artificial neural network identifies the new data pattern as a malicious data pattern. This identification is accomplished by examining the early high training rate associated with the new data pattern when the new data pattern is first detected. If that training rate, that is the rate at which the synaptic weights are altered, is greater than a particular threshold, then that new data pattern can be labeled as a malicious data pattern. The concept behind this identification of malware is that the data pattern of malware will be substantially different than the data patterns of any normal data patterns, any new normal data patterns, and any normal data patterns that have an anomaly associated with them (such as a few dropped bits). So when the hardware-based artificial neural network trains any new normal data pattern, the early training rate will not be much different than when the neural network was first initially trained to recognize normal data patterns at operation 120. However, when a malicious data pattern is encountered, the malicious data pattern will be much different from any normal data pattern (for example, because it will attempt to access protected memory), and this substantially different data pattern will cause a substantially different rate at which the synaptic weights are changed early on in the training phase. An operator of a system can determine a percentage to be considered to be substantially different between the training rates of the normal data patterns and the malicious data patterns. For example, it may be considered that a training rate that is 10% or more greater than the known training rate for normal data patterns indicates that the data pattern is malicious.

As indicated at 170, a hardware-based artificial neural network includes a comparator (or nodes or neurons), a memory location or register, a perceptron selector, and an expectation table that contains normal data patterns. FIG. 3 illustrates such a hardware-based artificial neural network 300 that can be used to implement the operations of FIG. 1 or 2. It should be noted that a hardware-based neural network can include a thousand or more comparators, each comparator including many neurons trained to recognize a particular normal data pattern. However, for simplicity's sake, only two comparators are illustrated in FIG. 3. FIG. 3 illustrates that coupled to the inputs of comparators 310, 311 is a memory location or register 320. As indicated in FIG. 3, the data input from a bus, packet, sensor, or other device is loaded into the memory location or register 320. Also coupled to the comparators 310, 311 is a perceptron (or neuron) selector 335. As indicated at 171 in FIG. 1, the comparators are configured to identify new data patterns that are not one of the normal data patterns. Each known, normal data pattern is associated with a particular comparator, so that that particular comparator includes the synaptic weights 315, 316 associated with that particular normal data pattern. These synaptic weight data resident in the comparators were acquired when the hardware-based artificial neural network was trained to learn all the normal data patterns. At 172, it is indicated that the hardware-based artificial neural network can be a single layer perceptron artificial neural network.

When new data come into the system, the multitude of comparators and neurons determine whether the new data include a new data pattern, and if the data do, whether that new data pattern is malicious in nature or not. Specifically, the incoming data pattern is provided to the comparators 310, 311, the perceptron selector 335, and an expectation table 330. The incoming data, and normally only the first few bits of the incoming data, are used as an address into the perceptron selector 335 to select a comparator 310, 311 to analyze the incoming data. The incoming data is multiplied by the synaptic weights 315 that are associated with the particular comparator 310. The comparator 310 then compares the synaptic weights calculated with the new pattern with the synaptic weights associated with a known pattern. The comparator, using these synaptic weights, is able to predict at 350, based on the known data pattern, whether the next bit in the new data pattern should be a 1 or a 0. The known data pattern is retrieved from the expectation table 330, which is addressed using the incoming data in the same manner as the perceptron selector 335 was addressed using the incoming data. If there are many incorrect predictions in the comparator, then the comparator has not recognized the new data pattern at 350 as being similar to the normal data pattern for which the comparator has been trained. If no comparator within the hardware-based artificial neural network recognizes the new data pattern, the system can conclude that this is an unknown data pattern. At this point, it is not certain if the unknown data pattern is malicious or not. Therefore, the hardware-based artificial neural network trains itself at 360 to learn the new data pattern, and the early training rate is observed at 365. As noted above, if the early training rate is a certain percentage higher than the training rates associated with normal data patterns, then the unknown data pattern is identified as malicious. If the comparator identifies the unknown data pattern as one of known data pattern from the expectation table 330, the neural network determines that the data pattern is not malicious.

As noted, in an embodiment, the artificial neural network can be implemented in hardware instead of software. That is, circuits of gates and switches can be designed to implement the artificial neural network nodal multiplications and summations used in the networks comparing and learning functions. By implementing the system as hardware-based instead of software-based, the system executes much faster and is able to more effectively identify malware or malicious data coming into the system.

Returning to FIG. 1, at 175, it is indicated that the data patterns that come into and that are analyzed by the artificial neural network include data patterns from a data bus, data patterns from an instruction bus, or data patterns from data packets. The hardware-based artificial neural network can then identify both malicious data and malicious instructions. More specifically, as indicated at 176, the training of the hardware-based artificial neural network using unknown data pattern includes correlating instructions with address locations that write to or read from safe memory locations. That is, if it is determined that the unknown data pattern includes instructions that only write to safe memory locations, then the unknown data pattern is unlikely to be a malicious data pattern.

At 180, it is indicated that the first rate at which the hardware-based artificial neural network alters the synaptic weights associated with the new data pattern is followed by one or more second rates at which the hardware-based artificial neural network alters the synaptic weights associated with the new data pattern. These different rates exist because the synaptic weights are altered less frequently as the neural network learns the new data pattern. That is, when the hardware-based artificial neural network first begins to learn the new data pattern, there are many changes to the synaptic weights associated with that data pattern. As the neural network learns the pattern, the synaptic weights are changed less frequently or at slower rate. Then, at 181, the neural network detects that decrease in altering the synaptic weights from the greater or faster first rate to a lesser or slower second rate. This rate decrease indicates that the neural network has successfully learned the new data pattern.

FIG. 2 is a block diagram illustrating operations and features of an example system and method for identifying computer system failure conditions. At 210, a hardware-based artificial neural network receives, in real time, computer system operating data from a computer system. At 220, the hardware-based artificial neural network is trained using the computer system operating data. As with data bus data, instruction bus data, and Internet packet data, this training results in the hardware-based artificial neural network learning the norm of the system. In this case, the norm relates to normal operating conditions of the computer system. As indicated at 222, the computer system operating data can include such parameters as a temperature of the computer system, a processing speed of the computer system, and a vibration of the computer system.

At 230, the hardware-based artificial neural network identifies a new pattern of the computer system operating data. This new pattern is identified when the new pattern deviates from the normal operating conditions of the computer system. Then, at 240, the hardware-based artificial neural network is trained using the new pattern such that the hardware-based artificial neural network learns the new pattern by altering synaptic weights associated with the new pattern. At 250, the hardware-based artificial neural network monitors a first rate at which the hardware-based artificial neural network alters the synaptic weights associated with the new pattern. Then, at 260, the neural network identifies the new pattern as indicating a failure in the computer system when the first rate at which the hardware-based artificial neural network alters the synaptic weights associated with the new pattern exceeds a threshold.

Like the process of FIG. 1 that identifies malware and/or malicious data, the process of FIG. 2 that identifies non-normal computer operating conditions can use the hardware-based artificial neural network illustrated in FIG. 3. And similar to the process of FIG. 1, in the process of FIG. 2, as indicated at 270, the comparator is configured to determine that the new data pattern is not one of the normal data patterns. Additionally, at 272, when there is a determination that the new data pattern is not one of the normal data patterns, the neural network is trained with the new data pattern, and during this training, the rate of the training is observed to determine whether the new data pattern is malicious. Additionally, as indicated at 273, the rate at which the hardware-based artificial neural network alters the synaptic weights associated with the new pattern is followed by a rate at which the hardware-based artificial neural network alters the synaptic weights associated with the new pattern. As noted in connection with FIG. 1, a decrease from a greater rate to a lesser rate indicates a learning of the new pattern by the hardware-based artificial neural network.

Figure 4:
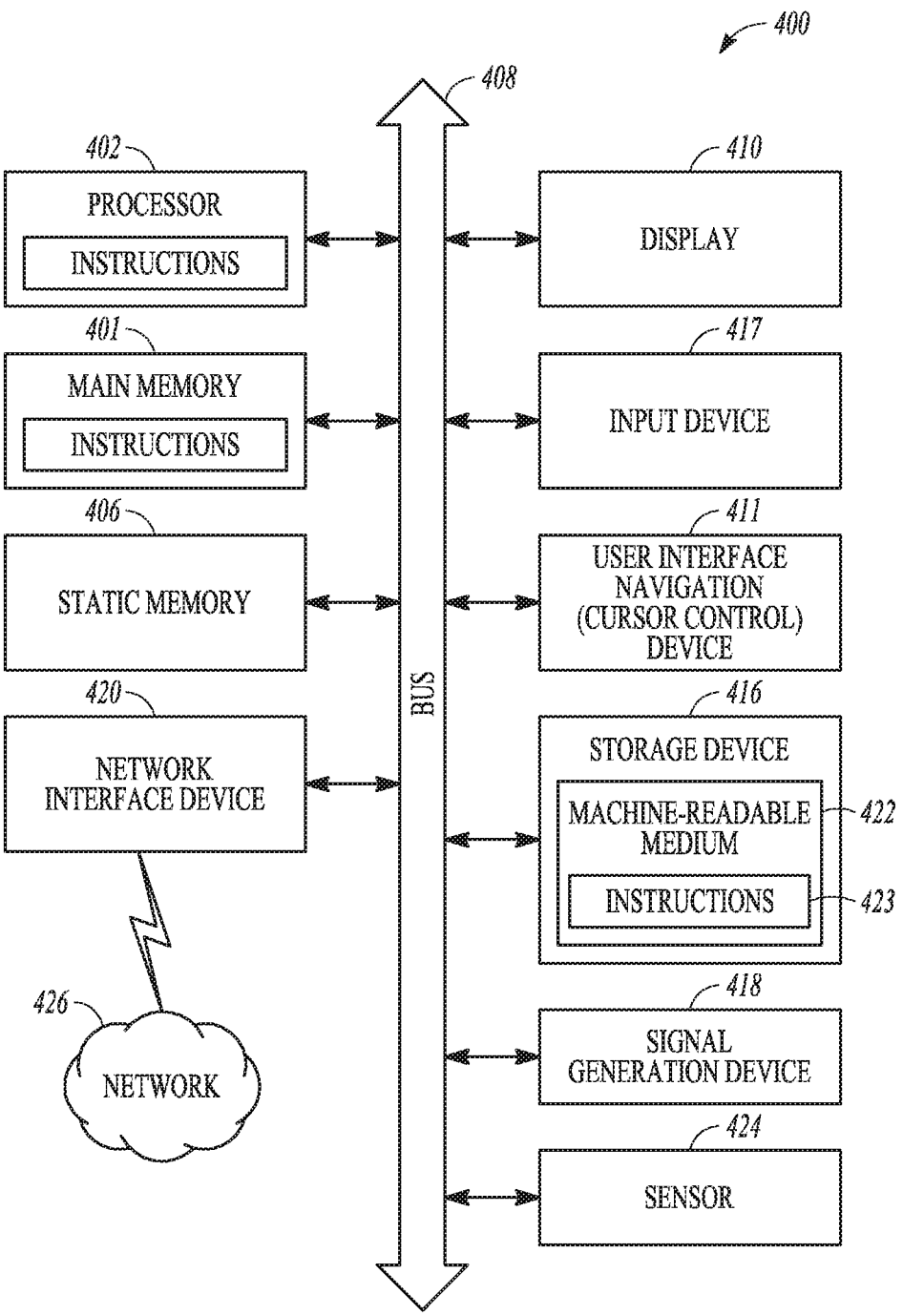
FIG. 4 is a block diagram of a computer system upon which one or more embodiments of the present disclosure can execute.

FIG. 4 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 401 and a static memory 406, which communicate with each other via a bus 408. The computer system 400 may further include a display unit 410, an alphanumeric input device 417 (e.g., a keyboard), and a user interface (UI) navigation device 411 (e.g., a mouse). In one embodiment, the display, input device and cursor control device are a touch screen display. The computer system 400 may additionally include a storage device 416 (e.g., drive unit), a signal generation device 418 (e.g., a speaker), a network interface device 420, and one or more sensors 421, such as a global positioning system sensor, compass, accelerometer, or other sensor.

The drive unit 416 includes a machine-readable medium 422 on which is stored one or more sets of instructions and data structures (e.g., software 423) embodying or utilized by any one or more of the methodologies or functions described herein. The software 423 may also reside, completely or at least partially, within the main memory 401 and/or within the processor 402 during execution thereof by the computer system 400, the main memory 401 and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 423 may further be transmitted or received over a communications network 426 using a transmission medium via the network interface device 420 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
   receiving data into a hardware-based artificial neural network;
   training the hardware-based artificial neural network using the data such that the hardware-based artificial neural network learns patterns within the data, thereby generating learned data patterns;
   retraining the hardware-based artificial neural network to learn new data patterns when new data deviates from the learned data patterns;
   training the hardware-based artificial neural network using the new data patterns such that the hardware-based artificial neural network learns the new data patterns by altering synaptic weights associated with the new data patterns;
   monitoring when and how often the hardware-based artificial neural network alters the synaptic weights to learn the new data patterns; and
   identifying anomalies have occurred in the new data patterns when the frequency at which the hardware-based artificial neural network alters the synaptic weights to learn the new data patterns exceeds a threshold; and
   wherein the hardware-based artificial neural network comprises:
   a comparator;
   a memory location or register to receive the new data, the memory location or register coupled to an input of the comparator; and
   a table containing the learned data patterns, the table coupled to the input of the comparator;
   wherein the comparator is configured to determine that the new data patterns are not one of the learned data patterns; and
   wherein in response to a determination that the new data patterns are not one of the learned data patterns, training the hardware-based artificial neural network with the new data patterns and observing when and how often the hardware-based artificial neural network alters the synaptic weights to determine whether the new data patterns are anomalies.

2. The process of claim 1, wherein the learned data patterns and the new data patterns comprise data patterns from a data bus, data patterns from an instruction bus, or data patterns from data packets.

3. The process of claim 1, wherein the training of the hardware-based artificial neural network using the new data comprises correlating instructions with address locations that write to or read from safe memory locations.

4. The process of claim 1, wherein the identifying anomalies comprises recognizing that the new data patterns are different than the learned data patterns.

5. The process of claim 1, wherein the hardware-based artificial neural network comprises a single layer perceptron artificial neural network.

6. The process of claim 1, comprising training the hardware-based artificial neural network with the new data patterns when the new data patterns are not one of the learned data patterns.

7. The process of claim 1, wherein the when and how often the hardware-based artificial neural network alters the synaptic weights associated with the new data patterns indicates a learning of the new data patterns by the hardware-based artificial neural network when there is a decrease in the when and how often the hardware-based artificial neural network alters the synaptic weights.

8. A system comprising:
   a computer processor; and
   a computer memory coupled to the computer processor and comprising instructions;
   wherein the computer processor is operable to execute the instructions and execute a process comprising:
   receiving data patterns in real time into a hardware-based artificial neural network;
   training the hardware-based artificial neural network using the data patterns such that the hardware-based artificial neural network learns normal data patterns;

identifying a new data pattern in the data patterns when the new data pattern deviates from the normal data patterns;
training the hardware-based artificial neural network using the new data pattern such that the hardware-based artificial neural network learns the new data pattern by altering synaptic weights associated with the new data pattern;
monitoring a first rate at which the hardware-based artificial neural network alters the synaptic weights associated with the new data pattern; and
identifying the new data pattern as a malicious data pattern when the first rate at which the hardware-based artificial neural network alters the synaptic weights associated with the new data pattern exceeds a threshold; and
wherein the hardware-based artificial neural network comprises:
a comparator;
a memory location or register to receive the new data, the memory location or register coupled to an input of the comparator; and
a table containing the learned data patterns, the table coupled to the input of the comparator;
wherein the comparator is configured to determine that the new data patterns are not one of the learned data patterns; and
wherein in response to a determination that the new data patterns are not one of the learned data patterns, training the hardware-based artificial neural network with the new data patterns and observing when and how often the hardware-based artificial neural network alters the synaptic weights to determine whether the new data patterns are anomalies.

9. The system of claim 8, wherein the data patterns comprise data patterns from a data bus, data patterns from an instruction bus, or data patterns from data packets.

10. The system of claim 8, wherein the training of the hardware-based artificial neural network using the new data pattern comprises correlating instructions with address locations that write to or read from safe memory locations.

11. The system of claim 8, wherein the identifying the new data pattern comprises recognizing a pattern that is different from the normal data patterns.

12. The system of claim 8, wherein the hardware-based artificial neural network comprises a single layer perceptron artificial neural network.

13. The system of claim 8, comprising training the hardware-based artificial neural network with the new data pattern when the new data pattern is not one of the normal data patterns.

14. The system of claim 8, wherein the first rate at which the hardware-based artificial neural network alters the synaptic weights associated with the new data pattern is followed by a second rate at which the hardware-based artificial neural network alters the synaptic weights associated with the new data pattern; and wherein a decrease from a greater first rate to a lesser second rate indicates a learning of the new data pattern by the hardware-based artificial neural network.

15. A process comprising:
receiving, in real time, computer system operating data from a computer system into a hardware-based artificial neural network;
training the hardware-based artificial neural network using the computer system operating data such that the hardware-based artificial neural network learns normal operating conditions of the computer system;
identifying a new pattern of the computer system operating data when the new pattern deviates from the normal operating conditions of the computer system;
training the hardware-based artificial neural network using the new pattern such that the hardware-based artificial neural network learns the new pattern by altering synaptic weights associated with the new pattern;
monitoring a first rate at which the hardware-based artificial neural network alters the synaptic weights associated with the new pattern; and
identifying the new pattern as indicating a failure in the computer system when the first rate at which the hardware-based artificial neural network alters the synaptic weights associated with the new pattern exceeds a threshold; and
wherein the hardware-based artificial neural network comprises:
a comparator;
a memory location or register to receive the new data, the memory location or register coupled to an input of the comparator; and
a table containing the learned data patterns, the table coupled to the input of the comparator;
wherein the comparator is configured to determine that the new data patterns are not one of the learned data patterns; and
wherein in response to a determination that the new data patterns are not one of the learned data patterns, training the hardware-based artificial neural network with the new data patterns and observing when and how often the hardware-based artificial neural network alters the synaptic weights to determine whether the new data patterns are anomalies.

16. The process of claim 15, wherein the computer system operating data comprise a temperature of the computer system, a processing speed of the computer system, and a vibration of the computer system.

17. The process of claim 15, wherein the first rate at which the hardware-based artificial neural network alters the synaptic weights associated with the new pattern is followed by a second rate at which the hardware-based artificial neural network alters the synaptic weights associated with the new pattern; and wherein a decrease from a greater first rate to a lesser second rate indicates a learning of the new pattern by the hardware-based artificial neural network.

* * * * *